United States Patent [19]

Burbidge

[11] Patent Number: 5,209,621

[45] Date of Patent: May 11, 1993

[54] TOGGLE BOLT STABILIZER

[76] Inventor: Myron L. Burbidge, 58 Chadwick #106, Halifax, Nova Scotia, Canada, B3M 3N2

[21] Appl. No.: 750,527

[22] Filed: Aug. 27, 1991

[51] Int. Cl.$^5$ ............................................. F16B 21/00
[52] U.S. Cl. ..................................... 411/340; 411/546
[58] Field of Search ............... 411/340, 342, 346, 546, 411/396, 401, 341, 345, 343

[56] References Cited

U.S. PATENT DOCUMENTS

| | | | |
|---|---|---|---|
| 34,837 | 4/1862 | Judd | 411/396 |
| 1,168,257 | 1/1916 | Kennedy | 411/346 |
| 2,120,577 | 6/1938 | Schulte | 411/73 X |
| 3,008,368 | 11/1961 | Hammitt et al. | 411/368 |
| 3,316,796 | 5/1967 | Young | 411/29 |
| 3,389,631 | 6/1968 | Vaillancourt | 411/346 |
| 4,221,154 | 9/1980 | McSherry | 411/34 |
| 4,747,737 | 5/1988 | Roffelsen | 411/546 X |
| 4,793,755 | 12/1988 | Brown | 411/63 X |
| 4,997,327 | 3/1991 | Cira | 411/342 X |

FOREIGN PATENT DOCUMENTS

| | | | |
|---|---|---|---|
| 1296883 | 6/1969 | Fed. Rep. of Germany | 411/346 |
| 558934 | 1/1944 | United Kingdom | 411/340 |

Primary Examiner—Rodney M. Lindsey
Attorney, Agent, or Firm—Malin, Haley, DiMaggio & Crosby

[57] ABSTRACT

A toggle bolt wall stabilizer to insure a snug and proper fit of the toggle bolt to ensure dimensional stability by filling the excess wall hole required to install the toggle bolt wings through the wall surface to the inside wall surface. The toggle bolt stabilizer includes a cylindrical body plug sized in diameter to match the toggle bolt wing diameter when closed during installation and including an inside passage longitudinally to receive the bolt shaft. In a preferred embodiment, an exterior annular lip on the exterior wall side may be provided to seat against the exterior wall surface and to prevent the bolt from falling through the wall aperture. Additionally, a spacer may be utilized to extend the bolt head from the wall firmly as a seat for hanging objects.

3 Claims, 1 Drawing Sheet

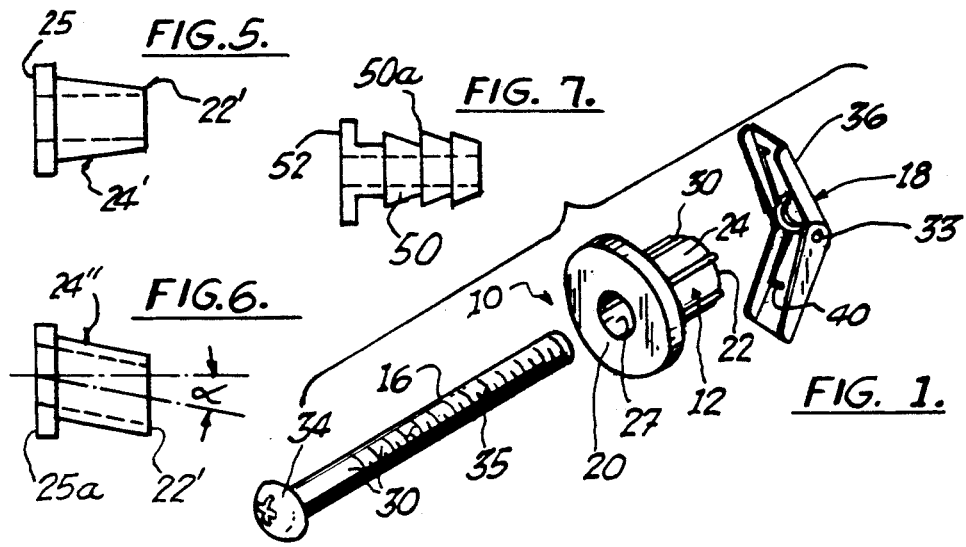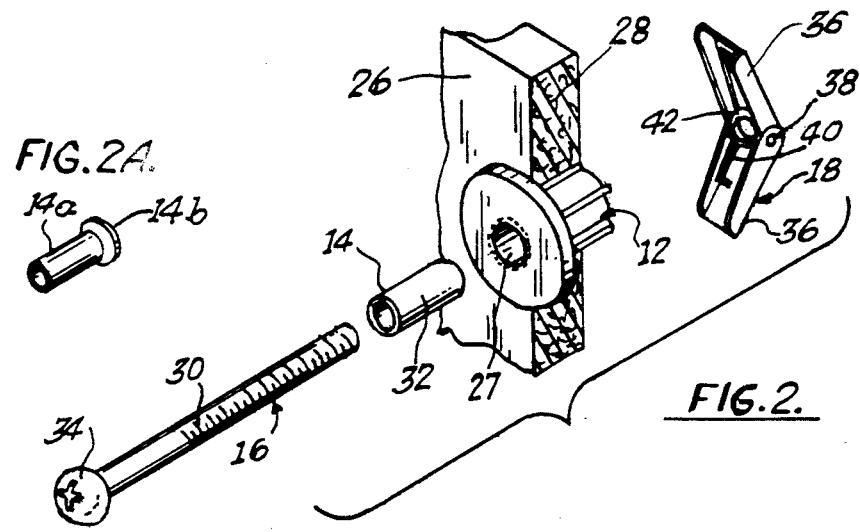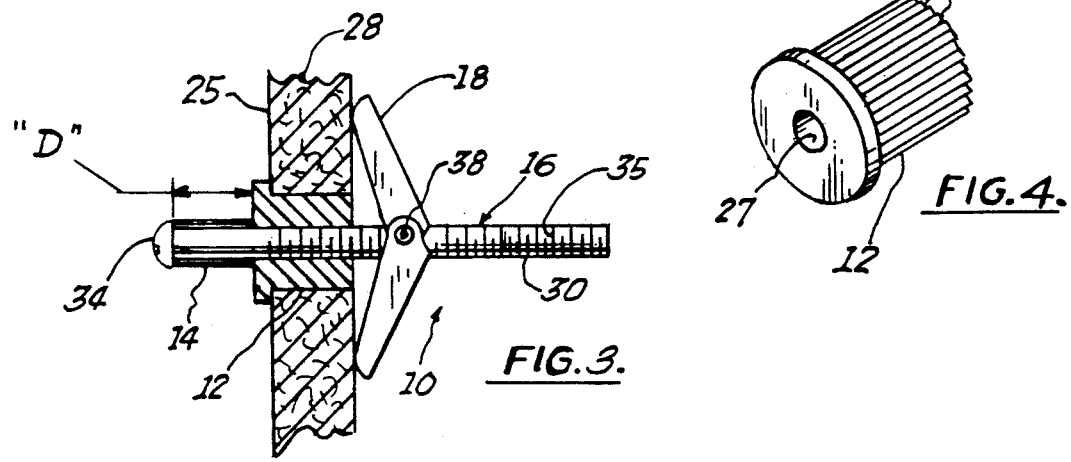

TOGGLE BOLT STABILIZER

BACKGROUND OF THE INVENTION

1. Field of the Invention

This invention relates generally to an improved toggle bolt fastener for hanging or through bolt mount of heavy objects on a hollow wall, and more particularly, to a toggle bolt wherein the stabilizer provides a snug fit between the toggle bolt exterior and the wall aperture perimeter thereby increasing the available shearout area to reduce wall distortion or damage. A bolt head spacer may be utilized with the sleeve to act as a seat for certain hanging objects.

2. Description of the Prior Art

Blind anchors and fasteners for attaching heavy objects to hollow walls are well known in the art. Typically, a toggle bolt fastener is employed comprising a threshold elongated bolt connectible to a toggle having one or more collapsible normally open toggle wings, threadably engaged on one side, which are inserted longitudinally through a hole in a wall of sufficient diameter to permit the transit of the toggle through the wall whereupon the toggle opens or moves perpendicular to the bolt shaft preventing its movement back through the wall hole. Such a toggle bolt is disclosed in U.S. Pat. No. 4,732,520 issued to Giannuzi. When the toggle is fully inserted through the wall thickness, the toggle wings move perpendicular to the bolt axis to provide a bearing surface against the wall interior surface to react loads imposed on the bolt from supporting heavy objects. A prime disadvantage of a toggle bolt is that the wall hole diameter must be large enough to accept the toggle diameter which exceeds greatly the bolt diameter leaving a circumferential space that results in sloppy fit between the bolt shaft and the wall hole after the assembly is installed. Accordingly, the bolt shaft may be shifted by the load away from a horizontal position with the bolt head low and the toggle bolt high resulting in possible wall damage and weakened support. Another disadvantage is that the bolt may slip during installation or mounting of an object through the enlarged hole and into the hollow wall space.

Other types of prior art hollow wall fasteners are of the type disclosed in U.S. Pat. No. 4,043,245 issued to Kaplan. The Kaplan patent overcomes the problems inherent in standard toggle bolt arrangements as described above through the use of a custom fit washer and wall anchor plate. Likewise, U.S. Pat. No. 4,075,924 issued to McSherry, et al. discloses a hollow wall anchor comprising a custom built retaining washer and elongated flexible leg members for insertion through a hole in the wall. Such complex hollow wall fasteners differ greatly from the conventional expandable wing toggle in complexity of installation and operation, without enhancing results.

Still other types of prior art in this area disclose "lug anchors" wherein an expandable insert is utilized to react applied load solely through the friction created between the insert's outer surface and the materials within which it is mounted. These suffer from reduced effectiveness caused by material thermal expansion and contraction, and vibration induced material deterioration.

Accordingly, there exists a need for a toggle bolt type of hollow wall blind fastener wherein a toggle bolt shaft can fit firmly in the wall aperture to ensure a stable wall mount for hanging objects on a wall.

SUMMARY OF THE INVENTION

This invention provides a toggle bolt and wall aperture plug forming a stabilizer insert combination for rigidly securing heavy objects to a hollow wall with a toggle bolt.

The toggle bolt is conventional and comprises a threaded elongated bolt having a pair of collapsible, normally open wings which are threadably mounted on one end. The bolt alone is slip fit through the invention comprising a cylindrical plug having a first end, a second end, a cylindrical outer surface sized in diameter to equal the toggle diameter therebetween, a hollow bore therethrough, and a longitudinal axial length at least greater than one half the wall thickness.

In the preferred embodiment, the stabilizer body first end has a perpendicular annular disk-shaped lip flange around its periphery which engages the outer wall surface when the toggle bolt and stabilizer body are inserted into the wall, thereby allowing the stabilizer to seat and preventing it from being drawn into the wall hole. The stabilizer cylindrical outer surface may contain either geometric surface undulations, or radial flange spurs to provide a mechanical friction and pressure lock between the stabilizer outer surface and the wall aperture inside surface to resist torque loads from installation.

The stabilizer may be designed to provide a longitudinal taper along its length to insure a snug fit between the stabilizer body exterior and wall material forming the wall aperture and can be geometrically adjusted to suit different materials having varying values of hardness.

The stabilizer may be fabricated from injected molded plastic or various other materials as dictated by specific material property requirements such as coefficients of expansion, conductivity, insulation, and values of hardness, strength, and flexibility among others, within the scope of the invention. The stabilizer is normally designed for mounting the toggle bolt perpendicular to the wall surface but may be adapted for angularly mounting the toggle bolt as dictated by design considerations. The stabilizer may be potted into the wall with a bonding agent if structural requirements necessitate additional strength.

In normal applications, the stabilizer will have a length less than the thickness of the wall being penetrated but at least one half as thick. A general purpose sleeve may be provided where the user could easily cut the sleeve to length to fit the particular wall in which it is being mounted. Notched areas corresponding to standard wall thickness may be provided to facilitate easy cutting to proper length.

A bolt head spacer is provided to keep the bolt head of the toggle bolt extended from the wall surface a predetermined distance to act as a seat only as may be needed to hang an object over the bolt. Also, the bolt head is maintained at a prescribed distance from the wall. The bolt head spacer is a thin-walled, preferably plastic cylinder having an outside diameter less than the diameter of the bolt head. The bolt head spacer outside cylindrical body acts as a support for engagement with an object mounting wire or string or to support the object directly. The spacer may include an end lip flange which engages the stabilizer body to prevent longitudinal movement toward the stabilizer (in the direction of the bolt axis) especially if the spacer is made of thin metal instead of rigid plastic. In one embodiment the spacer could be integrally constructed as one piece with the stabilizer body.

The entire assembly of stabilizer and toggle bolt (plus bolt head spacer if desired) is assembled by first sliding the stabilizer over the bolt shaft toward the bolt head before the toggle wings have been connected to the bolt. Next the toggle wings are screwed onto the threaded bolt shaft a sufficient distance from the bolt head ultimately so that the toggle wings spread open, after insertion through the wall once inside the wall cavity. For installation in the wall, the toggle wings and bolt end are then inserted through a hole in the wall, sized to receive the collapsed wings. Simultaneously the stabilizer mounted in the wall hole as a complete unit.

In accordance with the instant invention, it is an object thereof to provide a toggle bolt wall plug or stabilizer to provide a snug fit for the toggle bolt for firmly anchoring heavy objects to a hollow wall without distorting the wall material or causing wall failure.

It is another object of the instant invention to provide a low cost toggle bolt stabilizer capable of being utilized with varying wall thicknesses.

It is still a further object of the present invention to provide a toggle bolt stabilizer and bolt head spacer assembly for firmly mounting objects on a vertical, hollow wall made of materials such as plaster board.

And yet, another object of the invention is to provide a snug and secure fit within the large hole created to pass the toggle or toggle wings through the wall to the inside surface of the wall.

But yet still another object of the invention is to provide dimensional stability by positioning the toggle bolt shaft securely in the center of the wall hole thus preventing the toggle bolt shaft from moving to the edges of the large wall hole and away from the desired position.

In accordance with these and other objects which will be apparent hereinafter, the instant invention will now be described with particular reference to the accompanying drawings.

BRIEF DESCRIPTION OF THE DRAWINGS

FIG. 1 is an exploded perspective view of the bolt, wall stabilizer, and toggle wings.

FIG. 2 is an exploded perspective view of the stabilizer mounted in a wall (partially cut away) with a bolt head spacer. FIG. 2a is a perspective view of an alternate embodiment of a bolt head spacer.

FIG. 3 is a side elevational view in cross section showing a wall installed sleeve toggle bolt assembly.

FIG. 4 is a perspective view of the stabilizer with geometric surface undulations.

FIG. 5 is a side view of the stabilizer with a longitudinal taper.

FIG. 6 is a side view of the sleeve with an angular longitudinal body portion.

FIG. 7 is a side elevational view of an alternate embodiment of the invention.

DESCRIPTION OF THE PREFERRED EMBODIMENT

With reference to the drawings, in FIG. 1 there is depicted a disassembled toggle bolt and a stabilizer, generally indicated by the numeral 10, (elements 16 and 18) all comprised of wall mounted stabilizer, cylindrical body 12, threaded bolt 16 and toggle wing assembly 18, the bolt 16 and wing assembly 18 being conventional in construction.

In the preferred embodiment, stabilizer 12 comprises a rigid cylindrical body of a suitable material (preferably molded) having first end 20 and second end 22 which define cylindrical outer surface 24 therebetween. The stabilizer further has a centered longitudinal hollow bore or passage 27 therethrough having an inside diameter just slightly larger than the bolt 16 outside diameter for receiving mounting bolt 16 therein, which is described in greater detail below. Stabilizer first end 20 is constructed to form an annular lip radially extending outwardly as a flange 25 of greater diameter than stabilizer body cylindrical surface 24 to provide a flat bearing surface when mounted against outer surface 26 of hollow wall 28. In order to insure a firm connection between stabilizer 12 and wall 28, radially disposed flange spurs 30 may be incorporated into stabilizer body cylindrical outer surface 24 so that stabilizer body 12 is prevented from rotating about its longitudinal axis when mounted in a wall hole the size of the stabilizer body diameter. In lieu of flange spurs 30, the stabilizer 12 may be formed or molded with surface undulations 30' of a predetermined configuration such as peaks and valleys which serve the same function. To facilitate stabilizer and toggle bolt insertion into wall materials having low hardness values, stabilizer 12 may be configured with a longitudinal taper by making the second end 22 of lesser diameter than first end 20. This taper can be designed to accommodate different wall materials to obtain the best possible fit between stabilizer 12 and wall 28. Stabilizer 12 is normally employed with the mounting bolt 16 in perpendicular orientation relative to outer wall surface 26, but in an alternative embodiment, may be designed (FIG. 6) with lip flange 25a disposed at angle $a$ (alpha) relative to the axial longitudinal centerline of stabilizer 12 to facilitate mounting bolt 16 at an angle relative to outer wall surface 26 when necessary to accommodate different configurations of wall mounted objects. If additional strength is required, stabilizer 12 may be potted into wall 28 by applying a bonding agent to cylindrical outer surface 24 to adhere to the wall material, prior to insertion. Stabilizer 12 may be fabricated from injection molded plastic or various other materials and methods within the scope of the invention as dictated by design criteria such as coefficients of thermal expansion, conductivity and insulation, and strength, stiffness and hardness requirements. Stabilizer 12 may be fabricated having a general purpose length (at least greater than one half the wall thickness) further having pre-molded notches integrally molded into cylindrical outer surface 24 at predetermined distances relative to lip flange 25 corresponding to standard wall sizes such that the user may easily trim the stabilizer 12 in length to suit the particular application. Preferably the stabilizer length would be equal to the wall thickness for best results.

Bolt head spacer 14 FIG. 2 is a thin-walled hollow cylindrical member designed to slidably fit over shaft 30 of bolt 16. Spacer 14 has an outer surface 32 of a larger diameter than stabilizer passage 27 to act as a spacer between bolt head 34 and stabilizer flange 20 and of sufficient length whereby bolt head 34 is displaced a prescribed distance "D" (FIG. 3) from lip flange 25 when assembly 10 is installed in wall 28 to provide a seat or mounting surface for a heavy object hung over. Stabilizer 14 is fabricated preferably from plastic but may be constructed from alternate materials such as a thin metal or as dictated by design requirements.

In FIG. 3, bolt 16 is a standard bolt having shaft 30 with a threaded shank 35 at one end, and bolt head 34 at the other end with conventional screwdriver slots (Phillips or the like). Bolt 16 has a conventional toggle wing assembly 18 (to be discussed below) threaded onto its shank area.

Toggle wing assembly 18 in FIGS. 1-3 comprises a pair of toggle wings 36 pivotally and cooperatively attached by pin member 38 and by spring 40 for providing opening expanding force to return the wing members to a laterally extended, open position as shown. The wing assembly 18 includes mounting hole 42 between wings 36 for threadably engaging shank 35 of bolt 16. The design and construction of the toggle bolt of bolt 16 and of toggle wing assembly 18 are well known in the art and any variations of the foregoing design are within the scope of the invention.

To install the toggle bolt wall stabilizer 10 with a toggle bolt assembly insert assembly into a wall 28 for hanging a heavy object, one must first decide whether to use spacer 14 with stabilizer body 12. The spacer 14 is necessary if an extended bolt portion from the wall is necessary for hanging or supporting the object to be mounted on the wall. If so, spacer 14 is slip fit on bolt 16 to rest against bolt head 34. Next the stabilizer body 12 is then slidably mounted on bolt shaft 30. Finally, toggle wing assembly 18 is threadably mounted on bolt shank 35. A hole in wall 28 of sufficient diameter (at least the diameter of the closed wing assembly) for slip fitting toggle wing assembly 18 therethrough when wings 36 are transversely compressed must be provided. Stabilizer 12 is then press-fit into the wall hole to complete the assembly. In this manner, stabilizer 12 outer surface provides a positive wall fit for the invention 10 and wall 28 such that any load from supporting a heavy object can be evenly distributed in wall 28 through stabilizer 12 and toggle wing assembly 18 thereby eliminating the chances of toggle bolt attitude change, damage to the wall or the supported object from being dislodged.

FIG. 2A shows a modified bolt head spacer having a thin cylindrical tubular body 14a as shown previously with the addition of a flat, disk-like flange 14b at one end which when used will abut the end face 20 of stabilizer 12 to insure that the spacer 14a does not jam or slip inside the stabilizer passage 27. The end flange 14b would be especially useful if the spacer 14a body is made of a thin metal.

In another embodiment of the invention, the invention could be constructed so that the stabilizer insert and the spacer are unitarily constructed.

The stabilizer may be designed as an integral part of the toggle bolt assembly itself. In this design, the toggle bolt shaft would simply be enlarged as required in the area where the sleeve insert would knowingly be placed when in use.

In FIG. 7 a modified stabilizer 50 is shown which includes circumferential flanges 50a which are tapered stair step segments disposed around the body 50 which act to resist pulling outwardly from the hole in the wall once the stabilizer is inserted. The stabilizer 50 includes the first end annular flange 52 which is larger in diameter than the wall hole. The surface irregularities act as engaging teeth that resist longitudinal movement in one direction to insure that the tapered prongs 50a or teeth hold the sleeve firmly in the wall provided that the diameter of the wall hole is slightly smaller than the exterior tip of the teeth 50a.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An apparatus for fastening an object to a hollow wall for greater dimensional stability, said wall having an outer and inner wall surface, and an aperture therebetween comprising:

a bolt including an elongated shaft having a first end and a second end, said bolt having a bolt head at its first end and a threaded circumferential shank surface portion extending from its second end towards said first end;

toggle means threadably mounted on said bolt shank, said toggle means including a spring means for holding said toggle means in an open position perpendicular to said bolt shaft or permitting a collapsed position against spring tension which permits insertion through said hole in said wall extending from said outer wall surface to said inner wall surface;

a cylindrical body mounted mountable on said bolt shaft, said cylindrical body having an outer surface and a hollow central longitudinal passage therethrough for accepting said bolt shaft therein, said cylindrical body having a first and a second end, whereby said toggle means can be inserted through said hole in said wall and extended to bear against said inner wall surface, and said cylindrical body outer cylindrical surface securely engages said wall aperture and said cylindrical body rigidly secures and stabilizes said bolt relative to said wall, said cylindrical outer surface diameter being substantially equal to the collapsed toggle means diameter and the wall aperture diameter providing a snug fit of said cylindrical body in said wall; and a bolt head spacer comprising a thin walled hollow tube sized in diameter to fit around said bolt and in length to separate said bolt head from said cylindrical body by a prescribed amount to act as a seat to mount or hang an object from said bolt shaft, disposed on said bolt shaft, abutting said bolt head at one end and said cylindrical body at the other end, when said cylindrical body is mounted in said wall, said hollow tube having an inside surface of a smaller diameter then the bolt head and an outside surface of a diameter less than the bolt head, the outer surface of said hollow tube having a larger diameter than the hollow passage of said cylindrical body; said cylindrical body first end having a circumferentially disposed lip flange for stopping the inward axial movement of said cylindrical body into said wall hole; said lip flange being disposed at a predetermined angle relative to the axial longitudinal centerline of said cylindrical body to facilitate mounting said bolt at an angle relative to the outer wall surface.

2. An apparatus for mounting a heavy object on a hollow wall having an outer and inner wall surface, and a wall aperture comprising:

a bolt having a shaft with a head at its first end and a threaded shank area extending from its second end towards said first end;

a pair of collapsible toggle wings threadably mounted on said bolt shank, said toggle wings capable of being squeezed transversely to said bolt axis from a normally open position to achieve a collapsed position which permits insertion through a hole in said wall extending from said outer wall surface to said inner wall surface;

a stabilizer including a cylindrical body having a first end, a second end, a cylindrical outer surface therebetween, and a hollow passage therethrough for accepting said bolt shaft therein, said first end of said cylindrical body having a circumferentially disposed lip flange said cylindrical outer surface having surface undulations, whereby said wings can be inserted through said hole in said wall and extended to bear against said inner wall surface, and said stabilizer outer cylindrical surface diametrically rigidly engages said wall aperture and said stabilizer rigidly secures said bolt relative to said wall; and a spacer having a thin wall hollow tubular body disposed on said bolt shaft abutting said bolt head at one end and said cylindrical body end face at the other end, when said stabilizer is mounted in said wall, said hollow tube body having an inside surface of a smaller diameter than the bolt head and an outside surface of a diameter less than the bolt head, the outer surface of said hollow tube of a larger diameter than the hollow passage of said stabilizer.

3. An apparatus for mounting a heavy object on a hollow wall having an outer and inner wall surface, and a wall aperture comprising:

a bolt having a shaft with a head at its first end and a threaded shank area extending from its second end towards said first end;

a pair of collapsible toggle wings threadably mounted on said bolt shank, said toggle wings capable of being squeezed transversely to said bolt axis from a normally open position to achieve a collapsed position which permits insertion through a hole in said wall extending from said outer wall surface to said inner wall surface;

a stabilizer including a cylindrical body having a first end, a second end, a cylindrical outer surface therebetween, and a hollow passage therethrough for accepting said bolt shaft therein, said first end having a circumferentially disposed lip flange said cylindrical outer surface having surface undulations, whereby said wings can be inserted through said hole in said wall and extended to bear against said inner wall surface, and said stabilizer outer cylindrical surface diametrically rigidly engages said wall aperture and said stabilizer rigidly secures said bolt relative to said wall; and spacer comprising a thin wall hollow shaft disposed on said bolt shaft abutting said bolt head at one end and said cylindrical body end face at the other end, when said stabilizer is mounted in said wall, said hollow tube having an inside surface of a smaller diameter then the bolt head and an outside surface of a diameter substantially equal to the bolt head, the outer surface of said hollow tube of a larger diameter than the hollow passage of said stabilizer; said spacer includes an annular flange at one end for abutting said stabilizer.

* * * * *